INVENTOR.
JOSEPH C. HAMILTON
BY Rule and Hoge

Dec. 2, 1958 J. C. HAMILTON 2,862,402
TURRET AND STOP MECHANISM THEREFOR
Filed Oct. 28, 1955 2 Sheets-Sheet 2

INVENTOR.
JOSEPH C. HAMILTON
BY Ruley Hoge.

United States Patent Office 2,862,402
Patented Dec. 2, 1958

2,862,402

TURRET AND STOP MECHANISM THEREFOR

Joseph C. Hamilton, Toledo, Ohio, assignor to Owens-Illinois Glass Company, a corporation of Ohio Application October 28, 1955, Serial No. 543,540

6 Claims. (Cl. 74—526)

My invention relates to a machine comprising a carriage or turret mounted for rotation, means for intermittently rotating the turret and a novel form of stop mechanism for arresting the turret in a stop position, including means for adjusting the stop position.

The invention as herein illustrated is embodied in a glass molding machine by which mold charges of molten glass are molded to form hollow articles. The machine includes a blank mold into which charges of glass are dropped, a rotary turret comprising a mold table carrying neck molds which are brought into register with the blank mold by rotation of the turret, means for molding the glass to form parisons in the combined blank and neck molds, means for intermittently rotating the mold table for transferring the parisons to a finished mold station. The parisons are blown to final form in a finishing mold at the finishing mold station.

In operation it is important that the mold table, as it completes each step rotation, be stopped in an exact position of register with nonrotating parts. Owing to gradual wear of parts or changing conditions of operation it is found necessary to make adjustment of the stopping means from time to time. This involves a fine adjustment for obtaining and maintaining the exact registry of parts required for perfect molding operations. The present invention provides means for making and maintaining such adjustments.

Referring to the accompanying drawings.

Figures 1, 3:
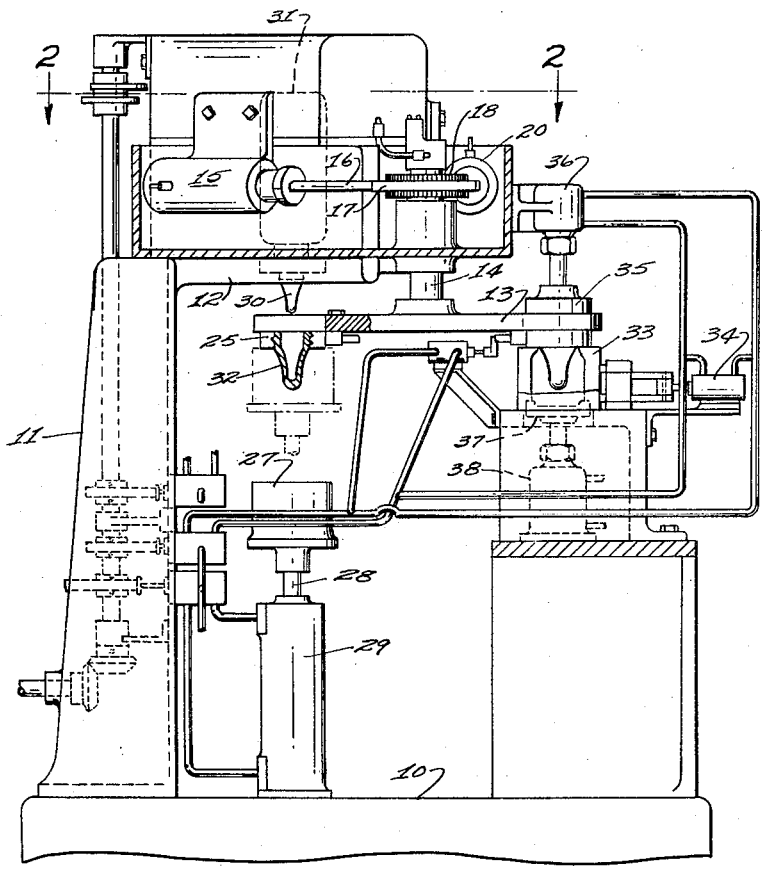
Fig. 1 is an elevational view, partly diagrammatic and with parts shown in section, of a glass molding machine embodying my invention.
Fig. 3 is a section at the line 3—3 on Fig. 2 showing an adjustable stop device for the mold carriage.
Figure 2:
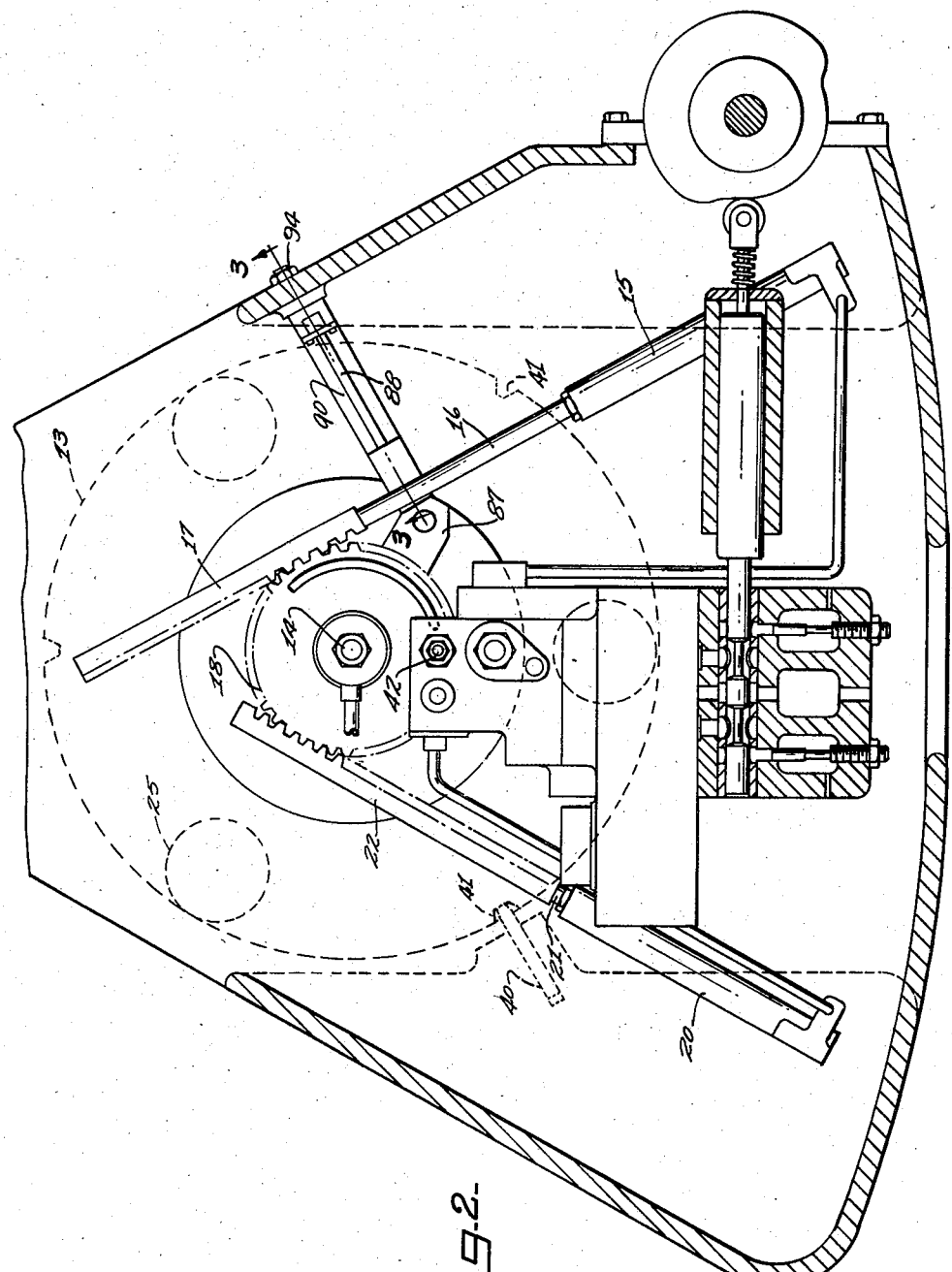
Fig. 2 is a part sectional view at the line 2—2 on Fig. 1.

Referring particularly to Fig. 1, the machine frame comprises a base 10, a standard 11 rising therefrom, and an upper framework 12 which provides a support for the turret, the latter including the mold table 13 mounted for intermittent rotation about a vertical axis. The table 13 is attached to the turret shaft 14 and is journalled for rotation in the frame 12. The turret is intermittently rotated step by step by a fluid-operated motor or cylinder 15. The motor piston 16 has connected thereto a rack 17 (Fig. 2) formed with rack teeth which mesh with gear teeth on a driving gear 18 mounted for free rotation on the turret shaft 14.

The gear 18 is periodically connected to rotate the turret forwardly in a clockwise direction. At the completion of each forward step rotation of the turret the gear 18 is disconnected and returned for the next succeeding indexing movement. The gear is returned by a piston motor 20, the piston rod 21 of which is connected to a rack bar 22 running in mesh with gear 18. Motor 20, in rotating the gear 18 while the latter is disconnected from the mold carriage, also operates to draw the rack 17 outwardly into position for the next step rotation of the turret.

The mold table 13 carries neck molds 25 mounted on the underside of the table for opening and closing movement. In the machine shown there are three neck molds spaced 120° apart circumferentially of the mold table. Each step rotation of the table is also through 120°, thereby bringing each neck mold to a blank mold station, a finishing mold station, and a discharge station. A blank mold 27 is connected to the piston 28 of a vertical stationary cylinder 29 at the blank mold station. A press plunger 30 positioned above the mold table is reciprocated vertically by a motor 31 in vertical alignment with the mold 27. While the mold carriage is at rest the blank mold 27 is moved upward to the broken line position (Fig. 1) while the plunger 30 moves downward into the combined blank mold and neck mold to form a parison 32 from a charge of molten glass which had been dropped into the blank mold. After this parison molding operation the plunger and blank mold are withdrawn vertically and the mold table rotated to bring the blank, which is suspended from the neck mold, to the blow mold station. The blow mold 33 which comprises partible sections is then closed around the parison by a cylinder 34. A blowing head 35 is moved downward by a cylinder 36 and a mold bottom 37 moved upwardly by cylinder 38. The parison is then blown to final form within the combined neck mold and finishing mold. The cylinders or motors 34, 36, and 38 are then reversed, the mold table indexed, and the finished article discharged or removed at the next station.

The mold table after each step rotation is locked by a locking pin 40 (Fig. 2) which is projected into one of three notches 41 in the periphery of the mold table. The gear 18 is connected to the turret for the indexing movement by an indexing pin 42 positioned above the mold table and projected downwardly into engagement therewith as by a piston motor, not shown.

The several motors, herein termed cylinders, are operated hydraulically. The hydraulic system, not per se a part of the present invention, may be of known construction and operation substantially as disclosed, for example, in the copending application of Robert R. Denman for Hydraulic Valve Control for Power Transmission Mechanism, Serial Number 462,230, filed October 14, 1954.

The stop mechanism for arresting the gear 18 at the completion of its indexing movement comprises a stop block 87 attached to the gear and cooperating with a stop rod 88 formed with a stop head 89. The rod 88 is mounted for lengthwise adjustment in a fixed frame member 90 or bracket bolted to the machine frame. A lever 91 connected by a pivot 92 to the bracket 90 bears against the end of the stop rod 88. A leaf spring 93 bolted to the lever 91 is attached to or operatively connected to the stop rod 88 and holds the latter with a strong pressure against the lever 91. As shown, the spring engages a notch 96 in the rod 88. An adjusting screw 94 threaded through the bracket 90 bears against the lever 91 and serves for adjusting the lever about its pivot 92. A lock nut 95 holds the adjusting screw in adjusted position. As the stop rod 88 contacts the arm 91 near the pin 92, a fine adjustment of the stop rod may be made by the adjusting screw 94. This construction permits extremely accurate and fine adjustments to be made of the stop position of the gear 18 and the turret connected thereto.

Modifications may be resorted to within the spirit and scope of my invention.

I claim:

1. The combination of a rotary element, means for rotating said element to a stop position, stop mechanism for arresting said element in said stop position, said stop mechanism comprising a stationary support, a stop rod mounted for lengthwise adjustment in said support, said rod being in the path of a stop surface of said element, an arm pivoted to said stationary support, an adjusting screw having a screw-threaded mounting in said support and contacting said arm, the adjusting rod being in contact with said arm at the opposite side thereof from said screw and at a point intermediate said screw and pivot, and means for yieldingly holding the stop rod in contact with said arm.

2. The combination set forth in claim 1, said last mentioned means comprising a leaf spring mounted on said arm, the stop rod being formed with a notch to receive the free end of the leaf spring.

3. The combination of a rotatable element mounted for rotation about an axis to a stop position, stop mechanism for arresting the said element in said stop position, the stop mechanism including a stop rod, a stationary support in which the rod is mounted for adjustment in the direction of its length, said rod being in the path of the rotatable element, and means for effecting a fine adjustment of the stop rod in the direction of its length and thereby of the stop position of the rotatable element, the adjusting means comprising an arm mounted to swing about a pivot, an adjusting screw in contact with said arm at a point remote from said pivot for adjusting the arm about said pivot, the stop rod being positioned with one end in engagement with said arm at a point near to the pivot.

4. A rotatable element mounted for rotation about an axis to a stop position, stop means for arresting said element in said stop position, said stop means including a stop rod, a stationary support in which said rod is mounted for adjustable movement in the direction of its length, a stop on the rotatable element, said rod extending about in the direction in which the stop on the rotatable element is moving as it approaches the stop position and having one end in the path of said stop and abutting the stop when the rotatable element reaches the stop position, and means for making a fine adjustment of said stop rod in the direction of its length and thereby effecting a fine adjustment of the stop position of the rotatable element.

5. The combination set forth in claim 4, the adjustment means comprising an arm, a stationary support on which the arm is pivoted, said stop rod being positioned to engage the arm at a point adjacent to said pivot, an adjusting screw having a screw-threaded connection with said stationary support and positioned to engage said arm at a point remote from the pivot for adjustably moving said arm about its pivot and thereby producing a comparatively fine adjusting movement of the stop rod.

6. The combination set forth in claim 5, including spring means for holding said rod against said arm.

References Cited in the file of this patent
UNITED STATES PATENTS

| | | |
|---|---|---|
| 1,154,895 | Teeple | Sept. 28, 1915 |
| 2,787,175 | Schurger | Apr. 2, 1957 |